May 7, 1963     T. D. PARRISH     3,088,607
LOADER

Filed Aug. 3, 1959     3 Sheets-Sheet 1

INVENTOR.
Thomas D. Parrish
BY
L. D. Burch
ATTORNEY

May 7, 1963 T. D. PARRISH 3,088,607
LOADER
Filed Aug. 3, 1959 3 Sheets-Sheet 3

INVENTOR.
Thomas D. Parrish
BY
L. D. Burch
ATTORNEY

United States Patent Office 3,088,607
Patented May 7, 1963

3,088,607
LOADER
Thomas D. Parrish, Flushing, Mich., assignor to General Motors Corporation, Detroit, Mich., a corporation of Delaware
Filed Aug. 3, 1959, Ser. No. 831,414
7 Claims. (Cl. 214—29)

This invention relates to hydraulic loaders and more particularly to a device for hydraulically loading scrap metal into a remelting furnace.

In the manufacture of metal parts, the usual method of disposing of certain scrap material is to remelt the material in a specially designed furnace for the reuse in the product manufacture. In order to convey the scrap material to the remelting furnace, several methods are available in the industry, each of which has numerous disadvantages. For example, the scrap material may be hand loaded into the remelting furnace, a method which obviously is an unsafe and impractical means of accomplishing the operation. Small portable loading devices are sometimes utilized, such as a power truck of some kind with a liftable bucket, traveling from place to place picking up the scrap material and depositing the scrap in a remelting furnace. This requires the use of expensive equipment, and further places the machine operator in close proximity with the furnace, making it hazardous and unsafe. Another method would be to provide some sort of conveyor system from a scrap pile to the furnace, utilizing skip buckets, or the like, to actually place the material within the furnace. Again, this requires expensive and cumbersome machinery with high maintenance and repair costs.

The device in which this invention is embodied comprises generally a hydraulically operated scoop, permanently located in a plant floor adjacent the remelting furnace and arranged to be lifted by a hydraulically operated cylinder in an arcuate path, placing the open end of the scoop well within the remelting furnace or in any of a number of positions therein. A second hydraulically operated cylinder is provided to push the material off the scoop and into the furnace.

The device is less cumbersome and complicated than other known methods and has relatively few moving parts, allowing relatively simple service and repair. The operator of the device may be located well away from the furnace, preventing obvious accidents. The scoop may penetrate to any desired degree into the furnace, allowing the scrap material to be placed in the best position for remelting and for opitmum conditions of the furnace fire.

Thus, a device is provided which is more economical and much safer to operate from the standpoint of preventing accidents. These and other advantages will become more apparent from the following description and drawings in which.

Figure 1:
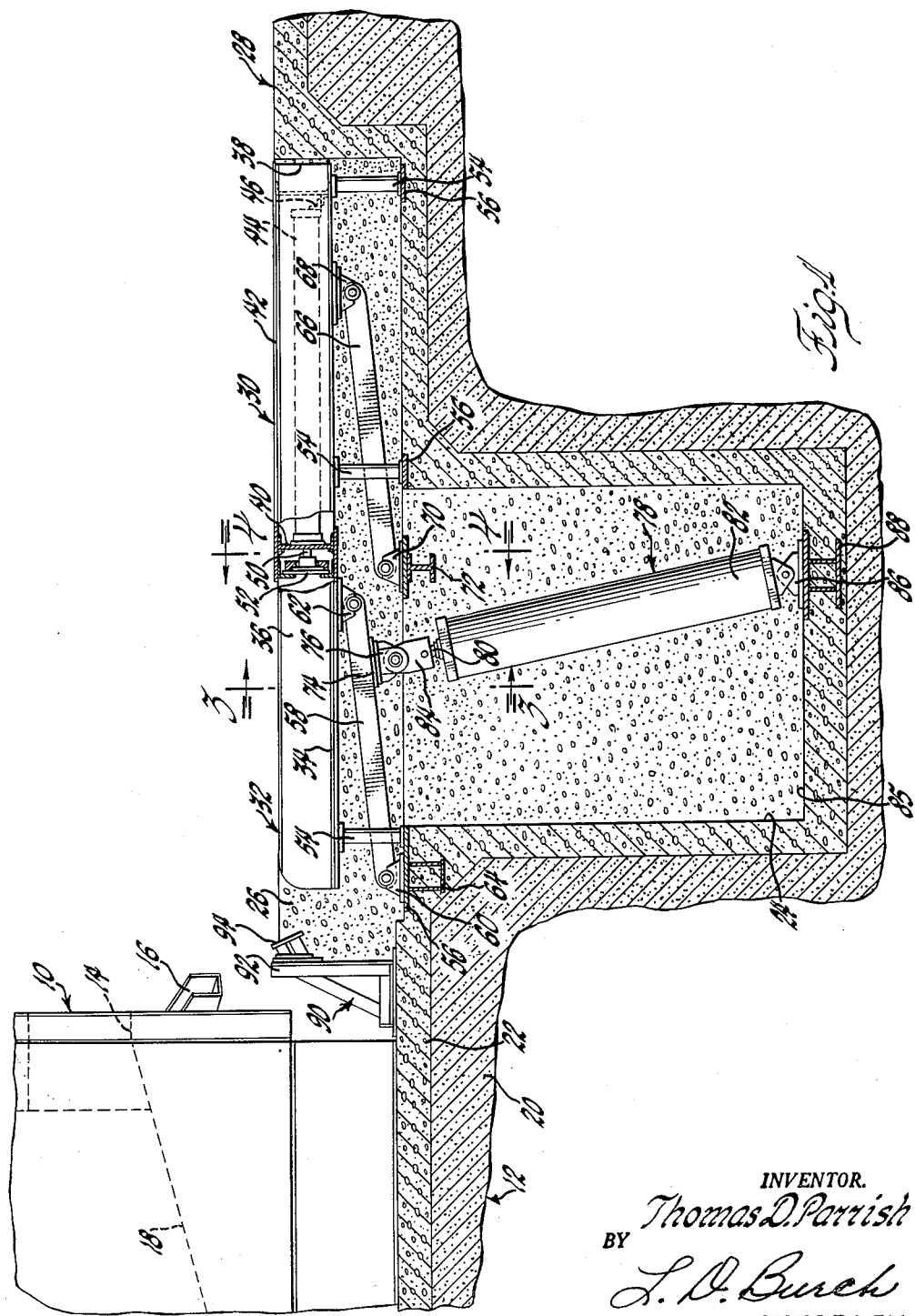
FIGURE 1 is an elevational view of the device with parts broken away and in section to illustrate the position of the various parts. The device is shown in its lower loading position.
Figure 2:
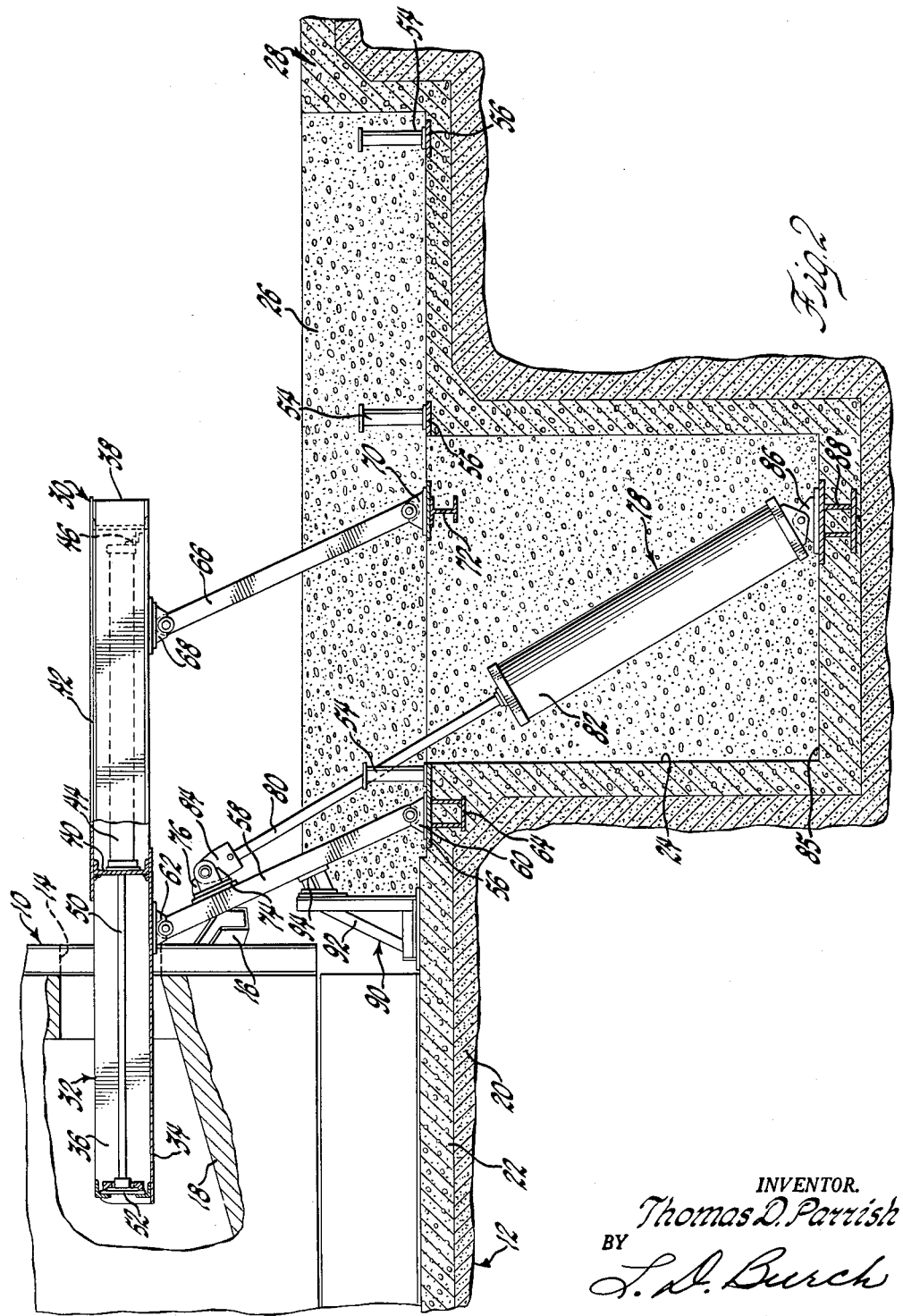
FIGURE 2 is an elevational view of the device shown in FIGURE 1 with parts broken way and in section illustrating the device in its upward or unloading position, with the scoop located inside the furnace.

As illustrated in FIGURES 1 and 2, a remelting furnace, indicated generally by the numeral 10, is shown located on a plant floor, illustrated generally by the numeral 12. The furnace has a door 14, through which the scrap material is loaded, and a chute or trough 16 to provide for removing the molten material from the furnace. The furnace floor 18 is inclined downwardly toward the rear for optimum heating conditions and for ease in building a suitable fire.

The plant floor 12 may be of any suitable nature, the floor depicted being for illustration purposes only. A sub-floor 20 may be provided, having a finish floor 22 of reinforced concrete or the like on top of the sub-floor 20. A pit 24 is located in the plant floor adjacent the front side of the furnace 10. A wall 26 may be provided at either side of the pit 24, or at just one side thereof, to receive the loading device, or the loading device may be set into a second elongated pit formed above the first pit 24. The structure illustrated in the drawings utilizes a single wall 26, located on one side of the pit 24, and a raised portion 28 of the same flooring material extending behind the loading device, illustrated generally by the numeral 30.

Figure 3:
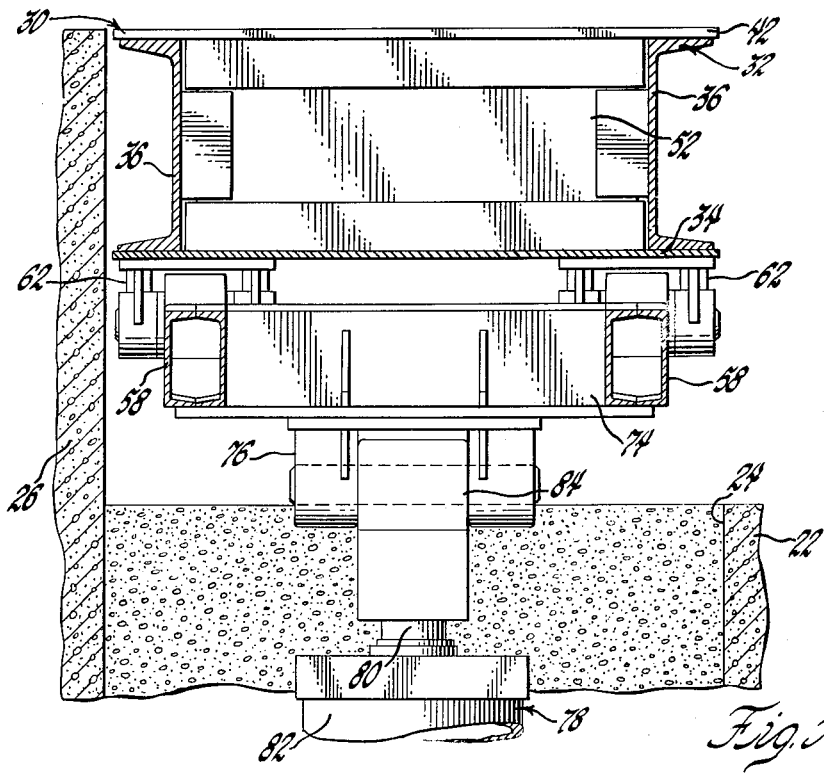
FIGURE 3 is a sectional view of the device shown in FIGURE 1 taken substantially along the line 3—3 of FIGURE 1 and looking in the direction of the arrows.
Figure 4:
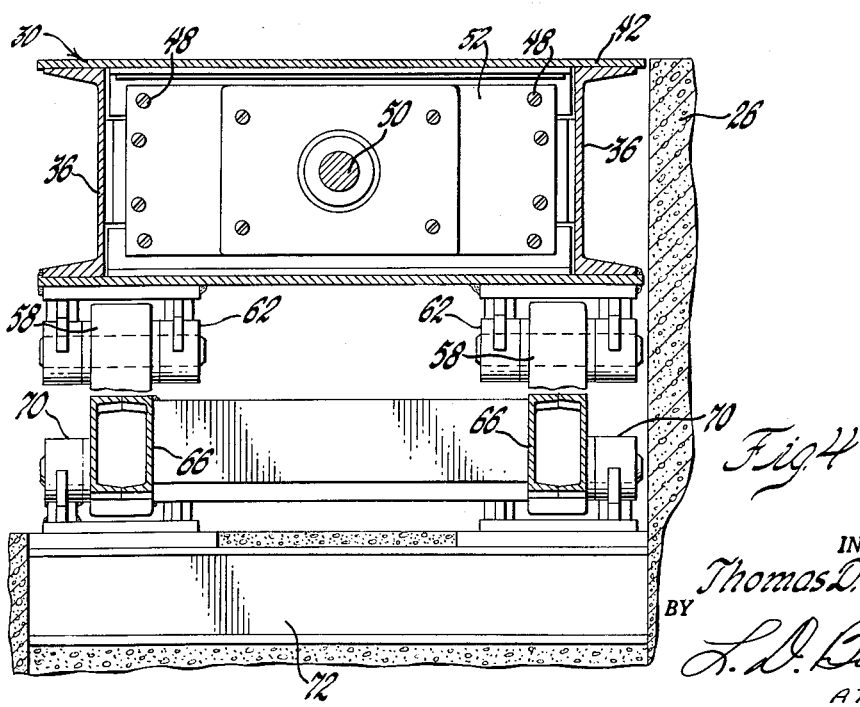
FIGURE 4 is a sectional view of the device taken substantially along the line 4—4 and looking in the direction of the arrows.

The basic part of the loading device 30 is the three-sided scoop 32, comprised generally of a floor 34 and side walls 36. The scoop may be made of any suitable material strong enough to support the load of scrap material which is to be placed therein. As shown in FIGURES 3 and 4, the side walls 36 may be constructed of channel beams. The scoop 32 extends along the length of the pit or wall 26, depending on which type of construction is used. An end plate 38 and a central bulkhead 40 provide support for a cover plate 42 which extends along the rear half of the scoop 32 for protection of a pusher cylinder, illustrated generally by the numeral 44.

The pusher cylinder 44 is secured to the base member 34, in any suitable manner, as by a bracket assembly illustrated generally by the numeral 46, and is secured to the central bulkhead 40 in any suitable manner, as by bolts 48 seen in FIGURE 4. A piston member (not shown) extends within the cylinder 44 and has a piston rod 50 extending therefrom and through the central bulkhead 40. The piston rod has a pusher assembly, illustrated by the numeral 52, mounted on the end thereof, which serves to scrape or push the scrap material that has been loaded in the forward open portion of the scoop, off the scoop and into the remelting furnace.

The scoop assembly is supported by a plurality of posts 54 located in the plant floor and on either side thereof. The posts rest on plate or beam members 56, imbedded in the concrete floor 22, and may be made of I-beam sections or any other suitable material capable of supporting the weight of the scoop assembly and the material to be remelted.

Two pairs of link members are provided between the floor 22 and the scoop assembly 32. The forward pair of link members 58 are pivotally mounted in the plant floor on the pivot brackets 60 and pivotally secured to the base plate 34 of the bucket assembly by the pivot brackets 62. The floor pivot brackets 60 may be secured on the steel plate or beam 56, also supporting the forward support member 54, and may also have extra reinforcing means such as the beam members 64. The rearward pair of link members 66 are pivotally secured to the base plate 34 of the scoop assembly by the pivot bracket members 68. The lower end of the rearward link members 66 are mounted over the pit 24 on pivot brackets 70 which in turn rest on the beam 72. Their positioning may be such as to be supported on the plant floor on mountings such as the mounting for the forward link members 58, above described.

Extending between the spaced parallel members 58 is a beam or support member 74, to which is secured a pivot bracket 76 for the lift piston and cylinder assembly, illustrated generally by the numeral 78. The piston (not shown) has a piston rod 80 extending out of the top of the cylinder member 82 and terminating in a plate 84 rotatably attached to the pivot bracket 76. The lower end of the cylinder member 82 is pivotally mounted in the floor 84 of the pit 24 by a bracket assembly, illustrated generally by the numeral 86. Reinforcing means, such as beams 88, may be provided in the concrete floor to support the cylinder and piston assembly 78.

The location of the piston rod with respect to the forward link members 78 is such that as hydraulic pressure is applied beneath the piston face, and in the lower portion of the cylinder 82, the scoop assembly will be raised and moved in a forward direction, the combination being an arcuate movement, to carry the scoop assembly through the door 14 of the furnace 10 to its unloading position illustrated in FIGURE 2. In FIGURE 2, the scoop assembly 30 is shown as being in its fully upward and forward position and it is to be understood that the motion may be stopped at any time between the position shown in FIGURE 2 and a position wherein the leading edge of the scoop assembly is just inside the door 14.

As also illustrated in FIGURE 2, the unload piston and pusher plate assembly 52 is in its fully extended position, showing that the pusher head clears the scoop of the material to be remelted. The timing of the actuation of the pusher head is such that the scoop assembly is completely at rest at some position within the furnace before the pusher piston operates. It may also be operated on the return stroke of the scoop assembly, in order to spread the material to any degree desired over an area of fire in the furnace.

When the scoop assembly is in the downward position, the position illustrated in FIGURE 1, the forward open portion of the scoop assembly may be loaded with scrap material in any suitable manner, such as by hand or with lift trucks or the like. Since the furnace door is closed at this time and there is no movement of the device, the loading operations into the forward end of the scoop assembly is much safer than loading the material directly into the furnace.

Thus, it may be seen that a relatively simple and uncomplicated device is provided for loading scrap material into a remelting furnace. It is obvious that many safety features are provided since the machine operator need not be in any degree of proximity to the loading device or the furnace at the time the material is put into the furnace.

In order to limit the forward motion of the scoop assembly by the lift cylinder and piston assembly 78, a stop member, illustrated generally by the numeral 90, is located adjacent the furnace end of the device. The stop member comprises a plurality of steel beams 92 and a stop pad 94 secured thereon in any suitable manner. The stop pad 94 is so positioned as to abut the forward parallel link members 58 at the extreme forward position.

What is claimed:

1. A loading device for a remelting furnace located on a floor having a pit therein adjacent said furnace and comprising a scoop, a plurality of pedestals mounted in said floor and supporting said scoop in the downward position thereof, a first pair of link members pivotally mounted in said floor at one end and pivotally secured to said scoop substantially midway along the length thereof, a second pair of link members pivotally mounted in said floor at one end thereof and pivotally secured to said scoop near the rearward end thereof, said second pair of link members being parallel to said first pair of link members, a lift cylinder pivotally mounted in the floor of said pit and extending upwardly toward said scoop, a piston received in said lift cylinder and having a piston rod extending therefrom, said piston rod being pivotally secured at the upper end thereof to said first pair of link members, said piston and said lift cylinder being operable to raise said scoop and said pairs of link members causing said scoop to follow an arcuate path toward and into said furnace with the floor of said scoop always in a substantially horizontal plane, and a piston and cylinder mounted on said scoop and at the rearward end thereof and operable to push the material from said scoop into said furnace when said scoop is positioned in said furnace by said lift cylinder and said piston and said link members.

2. In combination, a material-melting furnace or the like, an approach surface to said furnace extending adjacent thereto, a loading port provided in said furnace and being spaced above said approach surface, a material-handling platform, linkage means pivotally supporting said platform for movement between a material-receiving position substantially parallel to said approach surface and a material-unloading position extending through said loading port into said furnace, a portion of said platform having a depression to receive material, an enclosed compartment formed adjacent said depression and being spaced between said depression and said approach surface, a common wall separating said compartment and said depression, a material discharge port formed opposite said common wall, material-removing means provided in said depression and being reciprocable between a position adjacent said common wall and a position adjacent said discharge port, motor means provided in said compartment and being operably connected to said material-removing means through said common wall, and power means to actuate said motor means when said platform is in said material-unloading position to reciprocate said material-removing means and unload material carried by said platform through said discharge port.

3. The combination as defined in claim 2 and wherein said compartment is provided with a top surface substantially parallelly aligned with said approach surface in said material-receiving position to form a substantially continuous surface extending to said depression.

4. In combination, a material melting furnace or the like, an approach surface to said furnace extending adjacent thereto, a pit located between said furnace and said approach surface, a loading port provided in said furnace and being spaced above said pit and said approach surface, a material handling platform supported in said pit, linkage means pivotally supporting said platform for movement between a material receiving position substantially parallel to said approach surface and a material unloading position extending through said loading port into said furnace, a portion of said platform having a depression to receive material, an enclosed compartment formed adjacent said depression and being spaced between said depression and said approach surface, a common wall separating said compartment and said depression, said compartment including an upper plate having a top surface in substantial alignment with said approach surface in said material receiving position to form a continuation of said approach surface extending over said pit to said depression, said upper plate extending beyond said common wall to provide a recess thereunder, a material discharge port formed opposite said common wall, material removing means provided in said depression and being reciprocable between a position adjacent said common wall within said recess and a position adjacent said discharge port, motor means provided in said compartment and being operably connected to said material removing means through said common wall, means to actuate said motor means when said platform is in said material unloading position to reciprocate said material removing means from within said recess against material deposited in said depression to unload the material carried by said platform through said discharge port in said material unloading position and power means to move said platform between material receiving position and material unloading position.

5. The combination as defined in claim 4 and wherein rigid support means are provided in said pit to support said platform in said material receiving position.

6. The combination as defined in claim 4 and having said power means mounted in said pit beneath said platform and connected to said linkage to move said platform between said material receiving position and said material discharge position.

7. The combination with a material melting furnace or the like having a loading port provided therein, a material handling box movably supported adjacent said furnace for movement between a material receiving position and a material unloading position extending through said loading port into said furnace, said material handling box comprising a bottom plate having front, rear and side edges, a pair of vertically extending side wall plates secured to the side edges of said bottom plate, a vertical cross wall plate located between the front and rear edges of said bottom plate and extending between said side wall plates to divide said material handling box into front and rear compartments, a cover plate secured on said side wall plates and extending from the front edge of said bottom plate rearwardly beyond said cross wall plate to provide a recess therebeneath in said rear compartment, material removing blade means located in said recess and being movable therefrom across said rear compartment to said rear edge of said bottom plate, actuating means mounted in said front compartment for actuating said blade means, connecting means extending through said cross wall plate to connect said actuating means and said blade means, an approach surface extending adjacent to said furnace, a pit provided in said approach surface in front of said furnace and beneath said loading port, said pit having at least three vertically extending walls spaced closely adjacent the front and side edges of said bottom plate, a plurality of rigid support members provided in said pit to engage said bottom plate and support said box in said material receiving position in a location whereat the upper surface of said cover plate is substantially aligned with the surrounding approach surface to provide a continuous extension from said approach surface to said rear compartment, linkage means pivotally connected to said bottom plate and pivotally supported within said pit for movement of said box from said material receiving position to said material unloading position, and power means mounted in said pit to move said box on said linkage means between said material receiving position and said material unloading position.

References Cited in the file of this patent

UNITED STATES PATENTS

| | | |
|---|---|---|
| 440,260 | Freel | Nov. 11, 1890 |
| 627,721 | Edwards | June 27, 1899 |
| 785,156 | Curtis | Mar. 21, 1905 |
| 1,029,444 | Hoffman | June 11, 1912 |
| 1,053,020 | Fetherston | Feb. 11, 1913 |
| 1,409,716 | Henshaw | Mar. 14, 1922 |
| 1,757,772 | Johnson | May 6, 1930 |
| 2,674,386 | Larson | Apr. 6, 1954 |